United States Patent
Ko et al.

(10) Patent No.: US 7,187,939 B2
(45) Date of Patent: Mar. 6, 2007

(54) METHOD FOR REPORTING ACTIVATION STATUS OF FEATURE SERVICE IN MOBILE COMMUNICATION SYSTEM

(75) Inventors: Hong-Gi Ko, Kyungki-Do (KR); Seong-Ju Ahn, Kyungki-Do (KR); Sung-Ah Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 382 days.

(21) Appl. No.: 09/984,031

(22) Filed: Oct. 26, 2001

(65) Prior Publication Data

US 2002/0052213 A1 May 2, 2002

(30) Foreign Application Priority Data

Oct. 30, 2000 (KR) ............... 2000-63982
Dec. 28, 2000 (KR) ............... 2000-84716

(51) Int. Cl.
*H04Q 7/20* (2006.01)

(52) U.S. Cl. ............... 455/466; 455/433; 455/414.4; 455/435.3; 455/432.2; 455/560

(58) Field of Classification Search ............ 455/466, 455/411, 414.1–414.4, 432.1, 432.3, 433, 455/435.1–435.3, 456.2, 560; 379/201.1–201.2, 379/207.02–207.03
See application file for complete search history.

(56) References Cited

U.S. PATENT DOCUMENTS

| 5,890,063 | A | * | 3/1999 | Mills | 455/433 |
| 5,913,165 | A | * | 6/1999 | Foti | 455/435.3 |
| 5,966,671 | A | * | 10/1999 | Mitchell et al. | 455/550.1 |
| 6,029,065 | A | * | 2/2000 | Shah | 455/414.4 |
| 6,131,024 | A | * | 10/2000 | Boltz | 455/405 |
| 6,195,547 | B1 | * | 2/2001 | Corriveau et al. | 455/419 |
| 6,301,484 | B1 | * | 10/2001 | Rogers et al. | 455/466 |
| 6,317,593 | B1 | * | 11/2001 | Vossler | 455/414.1 |
| 6,381,456 | B1 | * | 4/2002 | Ko | 455/435.1 |
| 6,470,179 | B1 | * | 10/2002 | Chow et al. | 455/406 |
| 6,516,193 | B1 | * | 2/2003 | Salmela et al. | 455/432.3 |
| 6,597,910 | B1 | * | 7/2003 | Ra | 455/433 |
| 6,681,111 | B2 | * | 1/2004 | Ahn et al. | 455/432.2 |
| 6,684,069 | B1 | * | 1/2004 | Yoon | 455/414.1 |
| 2002/0045468 | A1 | * | 4/2002 | Jalili | 455/567 |

* cited by examiner

*Primary Examiner*—George Eng
*Assistant Examiner*—Marcos L. Torres
(74) *Attorney, Agent, or Firm*—Ked & Associates, LLP

(57) ABSTRACT

A method for reporting an activation status of an feature service such as termination conversion or termination rejection to a subscriber comprising the steps of activating a certain feature service using a feature code, and reporting the activation status of the feature service if a mobile station requests a location registration or a call origination is capable of reporting the activation status of the feature service to the subscriber at the preferable time or periodically using the service control point (SCP).

22 Claims, 6 Drawing Sheets

METHOD FOR REPORTING ACTIVATION STATUS OF FEATURE SERVICE IN MOBILE COMMUNICATION SYSTEM

BACKGROUND OF THE INVENTION

1. Field of the Invention

The present invention relates to a mobile communication system and more particularly, to a method for reporting activation status of feature service in a mobile communication system that can report activation status of feature services such as termination conversion and termination rejection to a subscriber.

2. Description of the Background Art

The current mobile communication system provides many feature services to subscribers. Among the services, the termination conversion and transmission rejection service are feature services for preventing a call termination to a mobile terminal of the subscriber and the subscriber activates or inactivates the operation of the corresponding service after registering the use of the feature service to the service provider. Therefore, the subscriber can reduce interruption of a telephone call for a short time before the feature service is inactivated before by activating the above feature service on a particular condition or for a particular object.

Activation or inactivation of the conventional feature service is done by a subscriber using an feature code or by a service provider in accordance with requests of the subscriber or an object in terms of operation. At this time the feature code is a code designated for recognizing the feature service and the code can be designated in each mobile communication service provider.

FIG. 1 is a schematic block diagram illustrating a conventional mobile communication system, and FIG. 2 is a view showing the method for activating the feature service in the mobile communication system of FIG. 1.

A subscriber transmits a feature code corresponding to the feature service which will be activated through the Mobile Station (MS) 10 and base station 20 to the Mobile Switching Center (MSC) 30 (1-a). The MSC 30 checks the feature code by analyzing the origination number dialed by the subscriber and then transmits the feature service processing request signal FEATREQ (feature request) to the Home Location Register (HLR) 40 (1-b).

The HLR 40 analyzes the feature code transmitted from the MSC 30 and makes sure to which service the corresponding feature code is applicable and whether the feature code is a code for activating or inactivating the feature service.

If the kind and activation type of the feature service are identified, the HLR 40 stores the status information of the corresponding feature service in the data base (DB) and then transmits the response signal featreq on the feature code processing request to the MSC 30 (1-c). At this time, the response signal featreq includes a feature code processing result and a output type (Tone or announcement) of the feature code processing result. The HLR 40 conducts failure processing in case the feature code which the subscriber transmitted is not a valid code.

Therefore, the MSC 30 analyzes the response signal featreq from the HLR 40 and reports the feature code processing result in the form of the Tone or announcement to the MS 10 by using a feature confirmation (1-d).

On the other hand, if the status of the feature service is changed by the subscriber, the HLR 40 transmits the status information of the feature service to the Visitor Location Register (VLR) 50 wherein the subscriber is positioned in accordance with the kind of the feature service.

Namely, as shown in FIG. 2, the HLR 40 reports the status information of the feature service by transmitting an authority information command (QUALDIR: Qualification Directive) to the VLR 50 in case that the status information (activation/inactivation) of the feature service is stored (1-e). The VLR 50 updates the status information of the feature service and transmits the response signal qualdir to the HLR 40 (1-f). Also, the VLR 50 ends a storing process of the feature service information by transmitting the QUALDIR to the MSC 30 and then receiving the response signal qualdir corresponding to the QUALDIR from the MSC 30 (1-g and 1-h).

Meanwhile, the activation or inactivation of the feature service in the mobile communication network can be processed by a customer management system of the service provider as well as the subscriber. The customer management system requests the change of the feature service information using a protocol defined between the customer management system and HLR 40. The HLR 40 changes the corresponding feature service information in the subscriber DB, and then reports the processing results to the customer management system.

Therefore, the MSC 30 and HLR 40 provides the corresponding feature service to the subscriber in accordance with the changed feature service status in case that subscriber is requested to originate or terminate a call.

A subscriber can prevent interruption from telephone calls for a while at a certain time and location by setting the activation or inactivation status of the feature service using the feature code. Even if a certain object or condition of the subscriber ends and the subscriber is able to receive phone calls again, the subscriber occasionally forgets that he or she activated the feature service and does not inactivate the feature service again. Therefore, conventionally, there was a problem that a subscriber can not get on line until the corresponding service is inactivated recognizing the activation status of the feature service.

SUMMARY OF THE INVENTION

Therefore, an object of the present invention is to provide a method for reporting activation status of feature service which can provide a subscriber convenience of using terminals by reporting the activation status of the feature service to the subscriber.

To achieve these and other advantages and in accordance with the purpose of the present invention, as embodied and broadly described herein, there is provided a method for reporting activation status of feature service comprising the steps of: activating a certain feature service using a feature code; and reporting the activation status of the feature service to a mobile station if the mobile station requests a location registration or a call origination.

To achieve these and other advantages and in accordance with the purpose of the present invention, as embodied and broadly described herein, there is provided a method for reporting activation status of feature service comprising the steps of: receiving a feature code from a mobile station (MS); discriminating a feature service type by analyzing the received feature code in a home location register (HLR); setting an activation status of the feature service and a reporting time of the activation status based upon the discriminated feature service type; reporting the activation status of the feature service to the MS in accordance with the set activation status reporting time.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The present invention provides a method for reporting the activation status of the feature service such as termination conversion or termination rejection. The present invention reports the activation status of the feature service in the form of a Pip Tone or Short Message when the location of a subscriber is moved or the subscriber tries to originate. Also, the present invention can report the activation status of the feature service at a favorite time or periodically using the Service Control Point (SCP) without the above time limitation.

Figure 1:
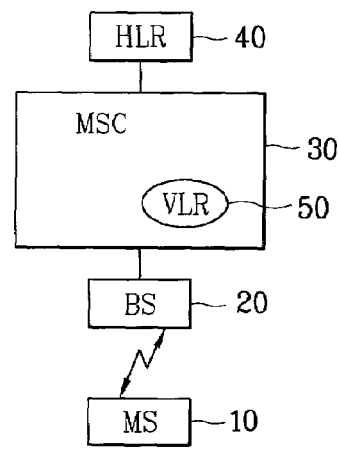
FIG. 1 is a schematic block diagram illustrating a conventional mobile communication system.
Figure 2:
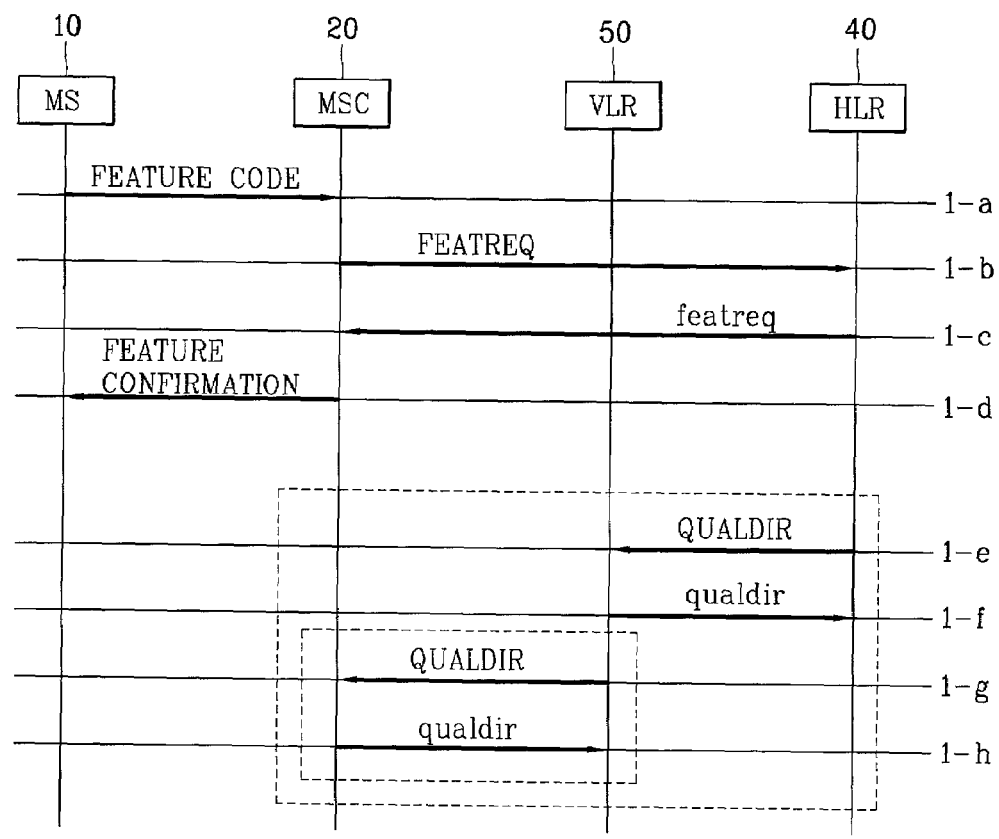
FIG. 2 is a view showing the method for activating the feature service in the mobile communication system of FIG. 1.
Figure 3:
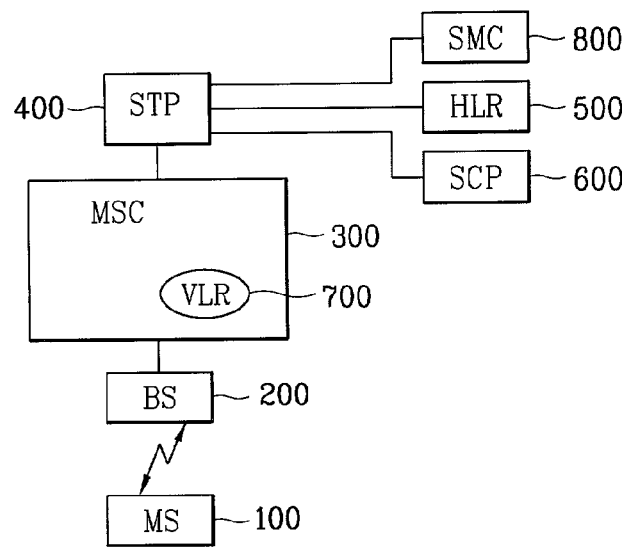
FIG. 3 is a schematic block diagram illustrating a mobile communication system in accordance with the present invention.
Figure 4:
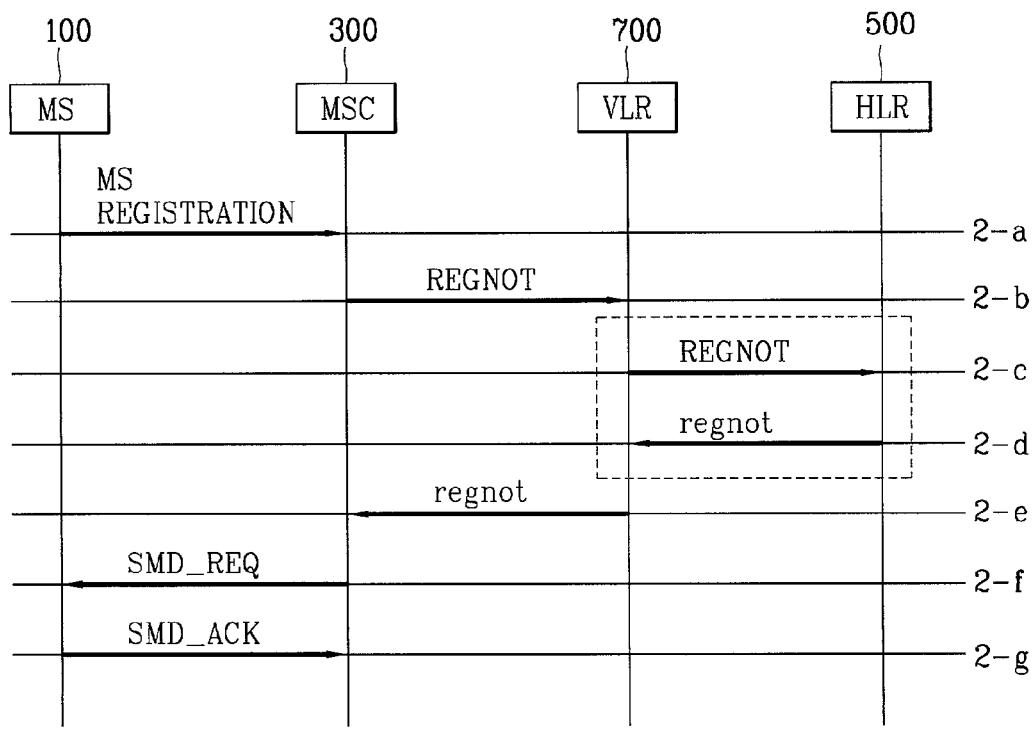
FIG. 4 is a view showing the method for reporting the activation status of the feature service according to the first embodiment of the present invention.

FIG. 3 is a schematic block diagram illustrating a mobile communication system in accordance with the present invention, and FIG. 4 is a view showing the method for reporting the activation status of the feature service according to the first embodiment of the present invention.

As shown in FIG. 4, in case the MS 100 of a subscriber moves to a new area or the subscriber turns on the power of the MS 100, the MS 100 transmits a message requesting a location registration to the MSC 300 through a base station 200 (2-*a*). The MSC 300 transmits a registration reporting signal (REGNOT:Registration Notification) to the VLR 700 through a Signaling Transfer Point (STP) 400 after it checks the transmitted message is a message for requesting location registration (2-*b*).

The VLR 700 registers a location information of the subscriber in accordance with the registration reporting signal REGNOT in case the subscriber who requests the location registration is a registered subscriber. On the other hand, in case the subscriber is not a registered subscriber, VLR 700 transmits the REGNOT for requesting the location registration processing to the HLR 500 (2-*c*). Thus, the HLR 500 processes the location registration of the subscriber and transmits the response signal reqnot that corresponds to the request of location registration of the subscriber to the VLR 700 (2-*d*).

The VLR 700 transmits the response signal regnot to the registration reporting signal REGNOT to the MSC 300. At this time, in case the feature service is on the activated condition, the activation status information of the corresponding feature service is included in the response signal regnot and transmitted (2-*e*). Therefore, after the MSC 300 detects the activation status of the feature service by analyzing the response signal regnot of the VLR 700, the MSC 300 reports the activation status of the feature service with the MS 100 of the subscriber (2-*f*) and receives the response signal (SMD-ACK) (2-*g*). At this time, a short message through a Short Message Delivery Request (SMD_REQ) or a Pip Tone is used as the reporting method. The present invention reports the activation status of the feature service using a short message since sound does not come Out in case of converting or prohibiting termination. Also, the short message can be transmitted directly from the MSC 300 to the MS 100 or transmitted through the short message center.

Figure 5:
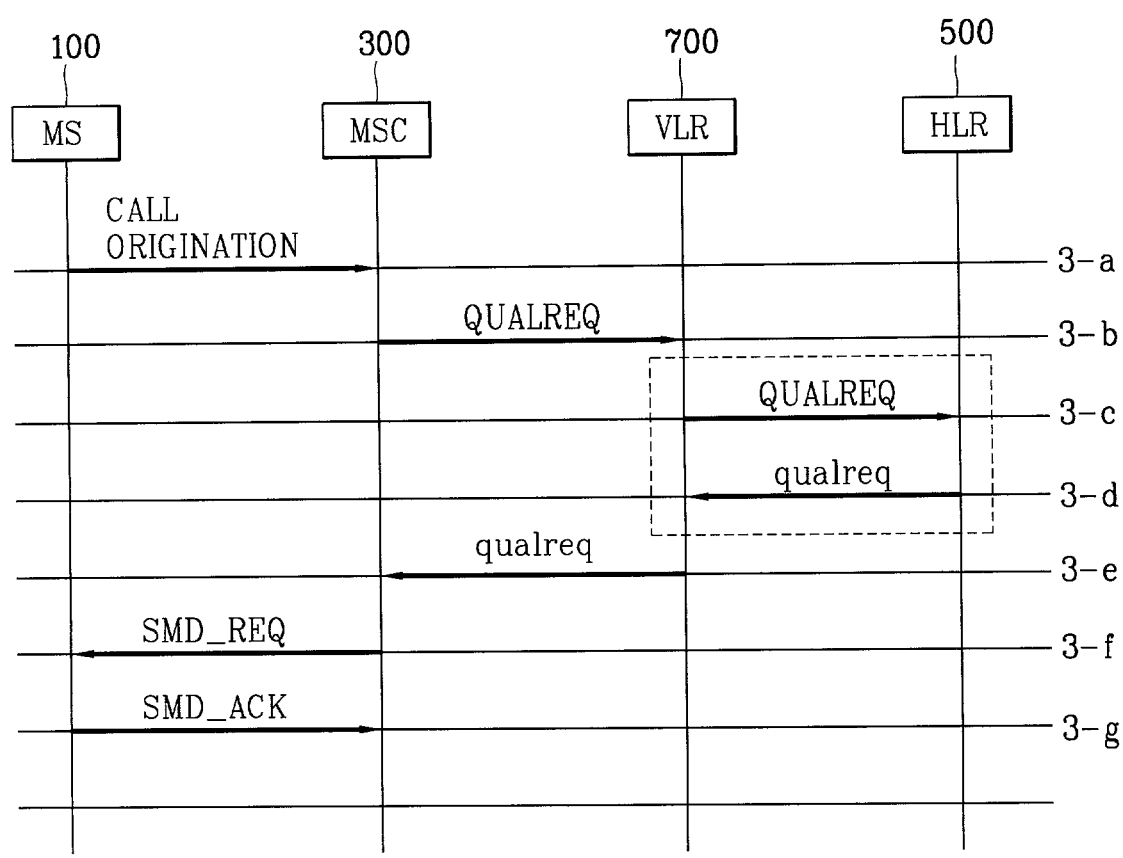
FIG. 5 is a view showing the method for reporting the activation status of the feature service according to the second embodiment of the present invention.

FIG. 5 is a view showing the method for reporting the activation status of the feature service according to the second embodiment of the present invention.

As apparent from FIG. 5, when the MS 100 of a subscriber tries to originate a call the MSC 300 analyzes the transmitted origination number and the originator number and then performs origination processing using the subscriber information of the subscriber (3-*a*). If the origination subscriber information does not exist, the MSC 300 requests the subscriber information by transmitting the authority information command (QUALREQ: Qualification Request) for requesting the subscriber information to the VLR 700 (3-*c*).

If the origination subscriber information exists, the VLR 700 transmits the subscriber information as the response signal of the QUALREQ to the MSC 300 (3-*e*). On the other hand, if the subscriber information does not exist, the VLR 700 transmits the QUALREQ to the HLR 500 again and requests the subscriber information (3-*c*). The HLR 500 analyzes the transmitted QUALREQ and transmits the subscriber information as the response signal qualreq to the VLR 700 (3-*d*), and the VLR 700 transmits the corresponding subscriber information as a respond signal qualreq to the MSC 300 (3-*e*).

The subscriber information transmitted from the VLR 700 to the MSC 300 includes the information indicating the activation status of the feature service. Therefore, the MSC 300 can check the activation status of the feature service such as a termination conversion or a termination rejection using the transmitted subscriber information. In case the feature service is activated, the MSC 300 performs the origination call processing and transmits a short message indicating the activation status of the feature service to the MS 100 using the SMD_REQ, and receives the response signal (SMD_ACK) (3-*f* and 3-*g*).

In the first and second embodiment of the present invention, the activation the method for reporting activation status of the feature service in case the location of the subscriber is changed or the subscriber tries to originate is described. However, the present invention can report the activation status of the feature service to the MS at the subscriber's preferable time or periodically.

Figure 6:
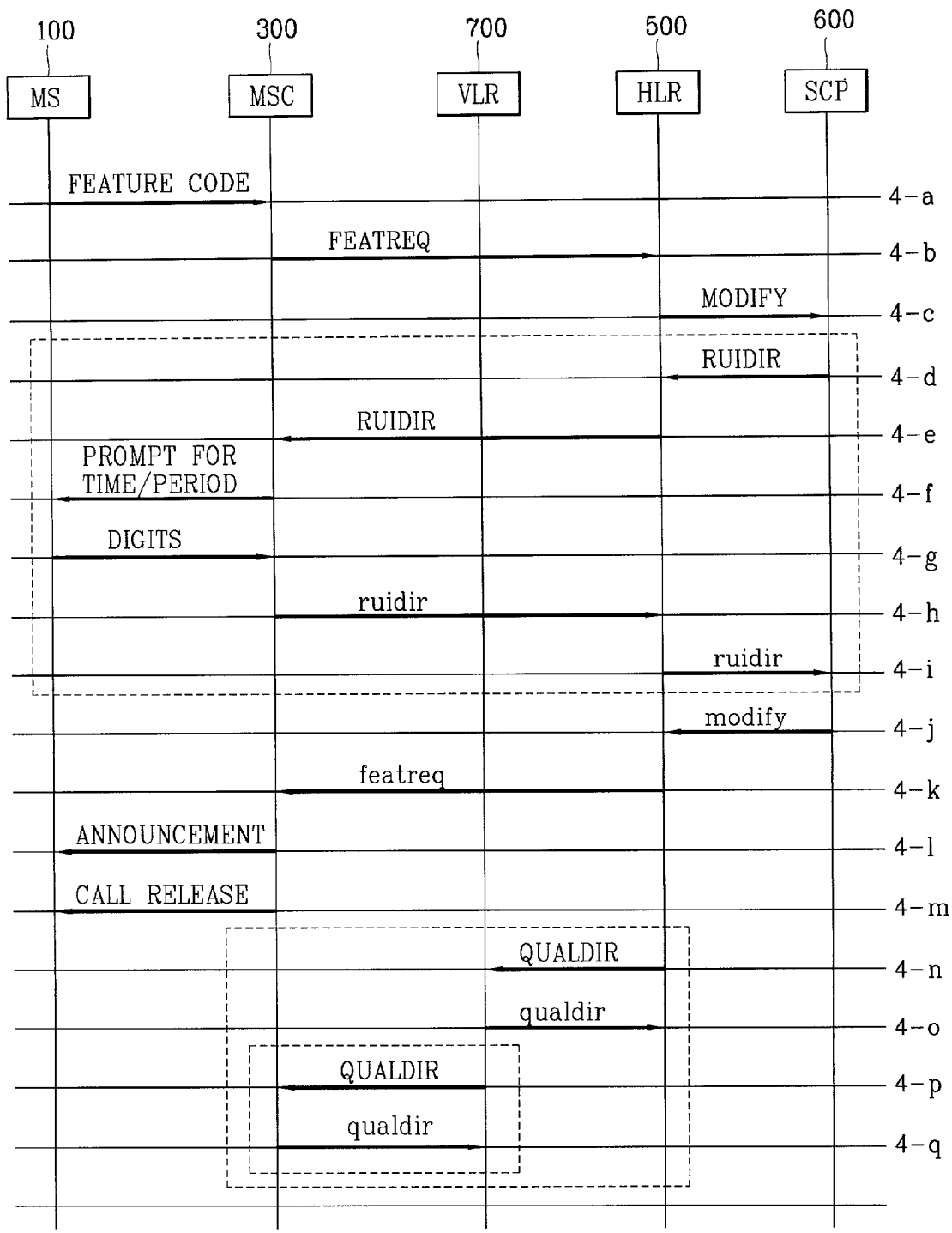
FIG. 6 is a view showing the method for setting the activation status and the reporting time of the activation status of the feature service in accordance with the present invention in the service control network.

FIG. 6 is a feature code processing procedure for setting the activation status of the feature service and a reporting period of the set activation status.

As shown in FIG. 6, when the feature code for setting the activation status of the feature service or/and the reporting time of the activation status is transmitted from the subscriber (4-a), the MSC 300 transmits the FEATREQ to the HLR 500 through the STP 400 after recognizing the above feature code (4-b).

The HLR 500 analyzes the transmitted FEATREQ and checks whether the transmitted feature code is indicating as conventionally or whether the code is for activation or inactivation. If the kind and the status of the feature service is checked, the HLR 500 stores the status information of the feature service in the DB and then transmits a signal (MODIFY) for requesting changing of the status information of the feature service to the Service Control Point (SCP) 600 (4-c). At this time, in case the subscriber inputs only the feature code for activating the feature service, the SCP 600 changes the activation status of the feature service according to the information request of the HLR 500 and then transmits the processing result of the feature service to the HLR 500 as a response signal.

In case the subscriber activates the status information of the feature service and at the same time, inputs the feature code for setting the reporting time of the feature service, the SCP 600 changes the activation status of the corresponding feature service according to the request for information change and then transmits the subscriber information requesting command (RUIDIR : Remote User Interaction Directive) to the HLR 500 to obtain the additional information from the subscriber (4-d). Therefore, the HLR 500 receives the reporting time or period of the activation information from the MSC 300 using the Remote User Interaction function and transmits it to the SCP 600 (4-e~4-i). The SCP 600 sets the reporting time of the feature service and transmits the response signal modify reporting the processing results to the HLR 500 (4-j). Since the later operations are the same as the conventional ones, the description is omitted.

Figure 7:
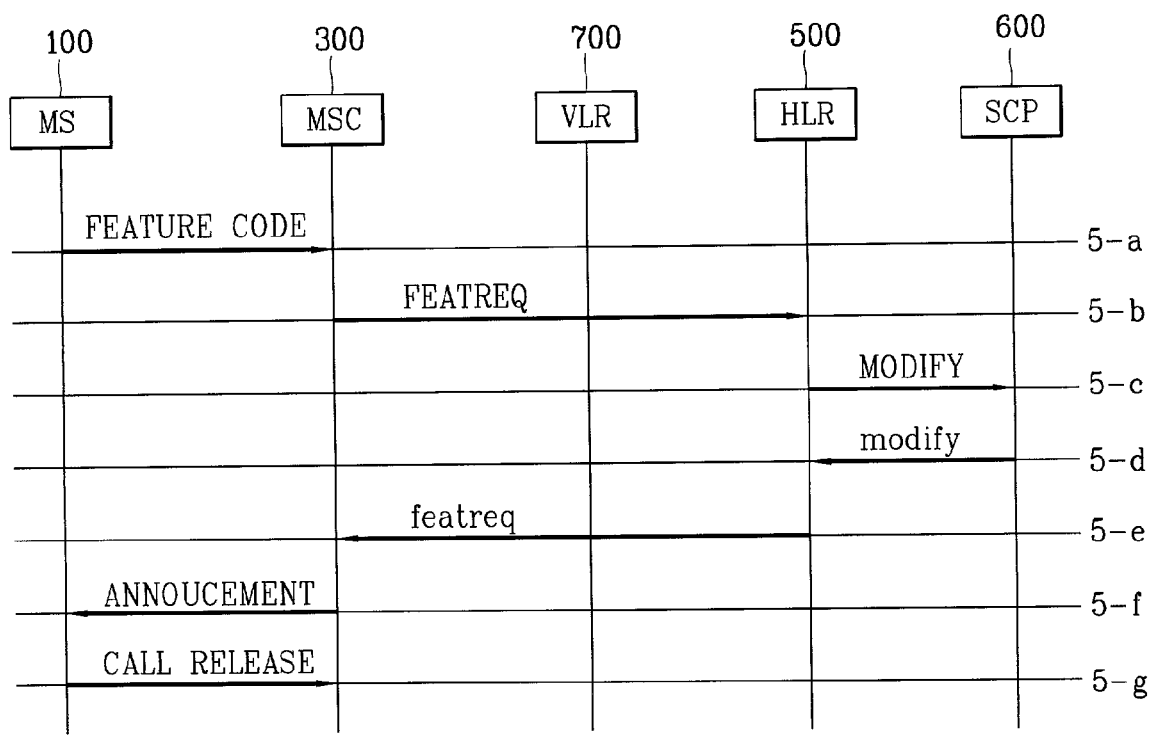
FIG. 7 is a view showing the method for changing the reporting time of the activation status of the feature service in FIG. 4.

FIG. 7 is a feature code processing procedure for changing the reporting time or reporting period of the feature service in accordance with the present invention.

When the subscriber transmits the feature code for changing the reporting period of the feature service using the MS 100 (5-a). The MSC 300 transmits the feature code processing request signal FEATREQ to the HLR 500 after checking that the origination number is the feature code (5-b). The HLR 500 analyzes the FEATREQ transmitted from the MSC 300 and requests the change of the reporting time to the SCP 600 in case that the transmitted feature code is a code for setting the reporting time(period) of the activation status (5-c).

Therefore, the SCP 600 changes the reporting time of the corresponding feature service according to a reporting time change signal MODIFY inputted from the HLR 500 and then stores the changed value in the DB. When the storing operation is finished, the SCP 600 transmits the response signal modify including the changed results of the reporting time to the HLR 500 (5-d), and the HLR 500 transmits the response signal featreq with respect to the feature code processing request to the MSC 300 (5-e). Therefore, the MSC 300 analyzes the response signal featreq received from the HLR 500 and disconnects the call after reporting the feature code processing results to the MS 100 in the form of a Tone or announcement as same as conventionally by analyzing the response signal featreq to the processing request of the feature code (5-f and 5-g).

Figure 8:
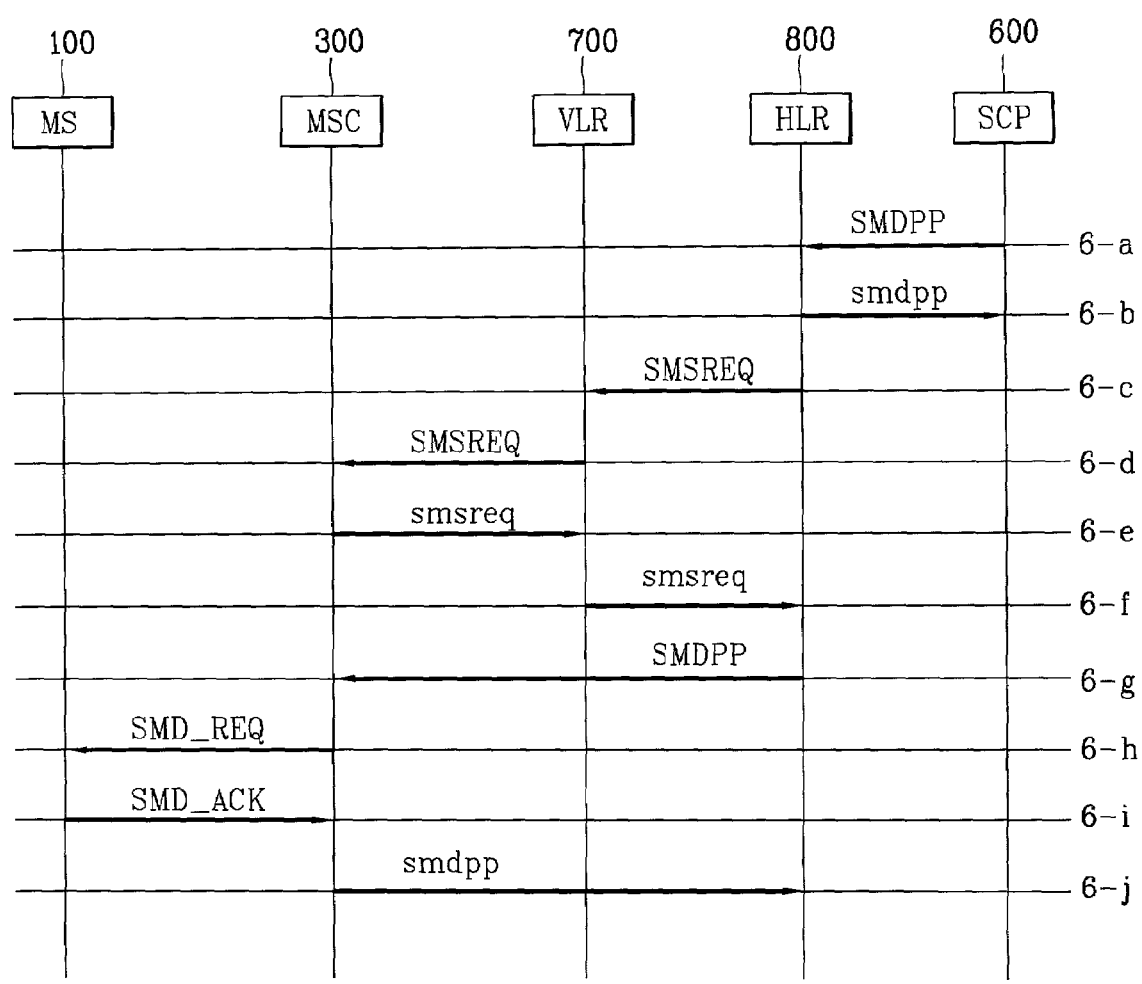
FIG. 8 is a view showing the method for reporting the activation status of feature service in accordance with the third embodiment of the present invention.

As shown in FIG. 8, the reporting time of a certain feature service predetermined by the internal timer function comes, the SCP 600 requests the short message transmission by transmitting a short message transmission signal (SMDPP Short Message Delivery Point-to-Point) to the HLR 800 (6-a). The HLR 800 transmits a short message request signal SMSREQ to the MSC 300 through the VLR 700 and obtains the routing information for transmission of the short message from the MSC 300(6-c~6-f). Once the routing information is obtained, the HLR 800 transmits a short message to the MSC 300 as same as the conventional short message processing so that the corresponding short message is transmitted to the MS 100 (6-g~6-j).

Through the procedures, the subscriber can prevent an unfavorable call conversion or call rejection by receiving the activation or inactivation status of the feature service which affects on the termination and origination with a terminal when a certain time or period comes.

The embodiments of the present invention are examples and does not limit the claims. Also, various alternatives, revisions and amendments will be self-evident to a person with an ordinary knowledge.

As described above, the present invention has an effect that the subscriber can take proper measures recognizing the activation status of the feature service and being reported about the activation status of the feature service in case the subscriber prohibits termination to the terminal by activating the feature service such as termination conversion or termination rejection.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for reporting an activation status of a feature service in a mobile communication system, comprising:

sending, by a user of a mobile station in the mobile communication system, a feature code from the mobile station, the feature code associated with activation of a certain feature service of the mobile communication system;

receiving the feature code and discriminating a feature service type by analyzing the received feature code in a home location register (HLR);

setting an activation status of the feature service by a Service Control Point (SCP) based upon the discriminated feature service type; and reporting the activation status of the feature service by a Mobile Switching Center (MSC) in the mobile communication system to the mobile station when the mobile station requests a location registration or a call origination, wherein the activation status informs the user about the activation status of the feature service entered by the user, and wherein the activation status of the feature service is stored in a Visitor Location Register (VLR) or a Home Location Register (HLR).

2. The method of claim 1, wherein the activation status of the feature service is reported in the form of a short message or a Pip Tone.

3. The method of claim 2, wherein the short message is outputted from a Mobile Switching Center (MSC) or a Short Message Center (SMC).

4. The method of claim 1, wherein reporting the activation status comprises:

requesting the location registration from the Mobile Switching Center (MSC) to the Visitor Location Registration (VLR) if the location registration is requested by the mobile station;

processing the location registration of a subscriber and transmitting a response signal to the MSC when the subscriber who requests the location registration is a registered subscriber; and reporting the activation status of the feature service to the MSC after analyzing the transmitted response signal.

5. The method of claim 4, wherein the response signal includes a processing result of the location registration and the activation status of the feature service.

6. The method of claim 4, wherein the VLR requests the location registration processing with the Home Location Register (HLR) when the subscriber who requests the location registration is not registered.

7. The method of claim 1, wherein reporting the activation status comprises:

requesting a subscriber information from a Mobile Switching Center (MSC) to a Visitor Location Registration (VLR) if the origination signal is received; and transmitting the activation status information of the feature service which is included in the subscriber information to the mobile station after receiving the subscriber information from the VLR.

8. The method of claim 7, wherein the VLR requests the subscriber information with a Home Location Register (HLR) when the subscriber information which the MSC requests does not exist.

9. A method for reporting an activation status of a feature service in a mobile communication system, comprising:

inputting, by a user of a mobile station (MS) in the mobile communication system, a feature code corresponding to a feature service of the mobile communication system and a reporting time corresponding to a time at which the MS is to be notified about an activation status of the feature service;

receiving the feature code from the MS;

discriminating a feature service type by analyzing the received feature code in a home location register (HLR);

setting the activation status of the feature service and the reporting time of the activation status by a Service Control Point (SCP) based upon the discriminated feature service type; and reporting the activation status of the feature service by a Mobile Switching Center (MSC) in the mobile communication system to the MS in accordance with the set activation status reporting time.

10. The method of claim 9, wherein the activation status of the feature service is reported in the form of a short message or a Pip Tone.

11. The method of claim 10, wherein the short message is outputted from the Mobile Switching Center (MSC) or a Short Message Center (SMG).

12. The method of claim 9, wherein setting the activation status of the feature service comprises:

transmitting an activation status change signal from the HLR to the Service Control Point (SCP) if the transmitted feature code is a code for changing the status information of the feature service; and changing the activation status of the feature service in accordance with the activation status change signal.

13. The method of claim 9, wherein setting the reporting time of the feature service comprises:

transmitting a reporting time change signal from the HLR to the Service Control Point (SCP) if the transmitted feature code and reporting time is a code for setting the reporting time of the activation status of the feature service;

requesting the subscriber information from the SCP to the HLR;

receiving the activation status reporting time from the MSC using a remote user interaction function and transmitting it to the SCP; and setting the activation status reporting time of the feature service in accordance with the transmitted activation status reporting time.

14. The method of claim 9, further comprising:

transmitting a reporting time change signal from the HLR to the Service Control Point (SCP) if the transmitted feature code is a code for changing the reporting time of the feature service; and changing the reporting time of the activation status in accordance with the reporting time change signal.

15. The method of claim 9, wherein reporting the activation status comprises:

counting the set activation status reporting time of the feature service;

requesting a short message transmission from the Service Control Point (SCP) to a Short Message Center (SMC) if the set activation status reporting time is reached;

obtaining a routing information from the MSC for transmitting the short message; and transmitting the short message indicating the activation status of the feature service to the MS in accordance with the routing information.

16. A method for reporting an activation status of a feature service in a mobile communication system, comprising:

discriminating a feature service type by analyzing a feature code received from a mobile station (MS) in a home location register (HLR);

setting an activation status and an activation status reporting time of the activation status based upon the discriminated feature service type; and reporting the activation status of the feature service to the MS in accordance with the set activation status reporting time, wherein setting the reporting time of the feature service, comprises:

transmitting a reporting time change signal from the HLR to a Service Control Point (SCP) if the transmitted feature code is a code for setting the reporting time of the activation status of the feature service;

requesting the subscriber information from the SCP to the HLR;

receiving the activation status reporting time from a Mobile Switching Center (MSC) using a remote user interaction function and transmitting it to the SCP; and setting the activation status reporting time of the feature service in accordance with the transmitted activation status reporting time.

17. The method of claim 16, wherein the activation status of the feature service is reported in the form of a short message or a Pip Tone.

18. The method of claim 16, wherein the short message is outputted from the MSC or a Short Message Center (SMC).

19. The method of claim 16, further comprising:
transmitting a reporting time change signal from the HLR to the SCP if the transmitted feature code is a code for changing the reporting time of the feature service; and
changing the reporting time of the activation status in accordance with the reporting time change signal.

20. The method according to claim 16, further comprising:
inputting, by a user of a mobile station in the mobile communication system, the feature code and a reporting time corresponding to a time at which the mobile station is to be notified about the activation status of the input feature code,
wherein the reporting further comprises informing the user of the mobile station whether or not a previously activated/deactivated feature service has been deactivated/activated.

21. The method of claim 20, wherein the informing the user further includes informing the user periodically or at a preset time selected by the user.

22. The method of claim 20, wherein the informing the user further includes informing the user whenever the user requests a location registration or a call origination.

* * * * *